(12) United States Patent
McGlen et al.

(10) Patent No.: US 11,168,944 B2
(45) Date of Patent: Nov. 9, 2021

(54) CAPILLARY DEVICE FOR USE IN HEAT PIPE AND METHOD OF MANUFACTURING SUCH CAPILLARY DEVICE

(71) Applicant: Thermal Corp., Wilmington, DE (US)

(72) Inventors: Ryan James McGlen, Northumberland (GB); John Gilbert Thayer, Lancaster, PA (US)

(73) Assignee: Aavid Thermal Corp., Wilmington, DE (US)

( * ) Notice: Subject to any disclaimer, the term of this patent is extended or adjusted under 35 U.S.C. 154(b) by 195 days.

(21) Appl. No.: 16/254,684

(22) Filed: Jan. 23, 2019

(65) Prior Publication Data

US 2019/0293360 A1 Sep. 26, 2019

Related U.S. Application Data

(63) Continuation of application No. 14/119,814, filed as application No. PCT/EP2012/059681 on May 24, 2012, now abandoned.

(30) Foreign Application Priority Data

May 24, 2011 (EP) .................................... 11167303

(51) Int. Cl.
*B23P 15/26* (2006.01)
*F28D 15/04* (2006.01)
*F28D 15/02* (2006.01)

(52) U.S. Cl.
CPC .............. *F28D 15/04* (2013.01); *B23P 15/26* (2013.01); *F28D 15/0233* (2013.01);
(Continued)

(58) Field of Classification Search
CPC .... F28D 15/04; F28D 15/046; F28D 15/0233; F28D 15/0275; B23P 15/26; Y10T 29/10;
(Continued)

(56) References Cited

U.S. PATENT DOCUMENTS 4,885,129 A 12/1989 Leonard et al.
6,330,907 B1 12/2001 Ogushi et al.
(Continued)

FOREIGN PATENT DOCUMENTS

CN 105689717 A 6/2016
EP 2119993 A1 11/2009
(Continued)

OTHER PUBLICATIONS

International Search Report and Written Opinion for Application No. PCT/EP2012/059681 dated Sep. 17, 2012 (11 pages).
(Continued)

*Primary Examiner* — Jun S Yoo
(74) *Attorney, Agent, or Firm* — Michael Best & Friedrich LLP (57) ABSTRACT

A capillary device (102) for use in a heat pipe in which heat is transferred from at least one evaporation region to at least one condensation region by means of evaporated working fluid is disclosed. The capillary device comprises a body portion defining chambers (108) containing powdered material (110) therein, wherein at least part of the periphery of at least one said chamber is porous to allow flow of condensed working fluid, by means of capillary action, through said powdered material in said chamber when flowing from a condensation region to an evaporation region.

21 Claims, 11 Drawing Sheets

(52) U.S. Cl.
CPC .............. *F28D 15/046* (2013.01); *Y10T 29/10* (2015.01); *Y10T 29/49353* (2015.01); *Y10T 29/49396* (2015.01)

(58) Field of Classification Search
CPC ......... Y10T 29/49396; Y10T 29/49353; B22F 10/28; B22F 7/002
See application file for complete search history.

(56) References Cited

U.S. PATENT DOCUMENTS

| | | | |
|---|---|---|---|
| 7,748,436 | B1 | 7/2010 | Anderson et al. |
| 9,841,241 | B2 | 12/2017 | Chaix et al. |
| 9,863,716 | B2 | 1/2018 | Kokas et al. |
| 10,054,995 | B2 | 8/2018 | Jenkins et al. |
| 10,146,275 | B2 | 12/2018 | Ghioni et al. |
| 2003/0075306 | A1 | 4/2003 | Zuo et al. |
| 2005/0126758 | A1 | 6/2005 | Schulz-Harder |
| 2005/0221150 | A1* | 10/2005 | Revol ................. H01M 8/0258 429/434 |
| 2006/0283574 | A1 | 12/2006 | Huang |
| 2007/0240855 | A1 | 10/2007 | Hou et al. |
| 2009/0025910 | A1 | 1/2009 | Hoffman et al. |
| 2009/0084526 | A1 | 4/2009 | Chang et al. |
| 2009/0250196 | A1* | 10/2009 | Batty ................... F28F 21/065 165/104.26 |
| 2010/0018048 | A1 | 1/2010 | Sakai et al. |
| 2010/0071879 | A1 | 3/2010 | Hou |
| 2010/0089554 | A1 | 4/2010 | Lee et al. |
| 2010/0181048 | A1 | 7/2010 | Hwang et al. |
| 2011/0174474 | A1* | 7/2011 | Liu ...................... F28D 15/046 165/185 |
| 2014/0190667 | A1 | 7/2014 | McGlen et al. |
| 2015/0237762 | A1 | 8/2015 | Holt et al. |
| 2015/0289413 | A1 | 10/2015 | Rush et al. |
| 2016/0209126 | A1 | 7/2016 | Stieber |
| 2017/0013747 | A1 | 1/2017 | Agostini et al. |
| 2017/0064868 | A1 | 3/2017 | Rush et al. |
| 2018/0187979 | A1 | 7/2018 | Drolen et al. |

FOREIGN PATENT DOCUMENTS

| | | |
|---|---|---|
| EP | 3153808 A1 | 4/2017 |
| EP | 3279597 A1 | 2/2018 |
| WO | 2008146129 A2 | 12/2008 |
| WO | 2009049397 A1 | 4/2009 |

OTHER PUBLICATIONS

Extended European Search Report for Application No. 11167303.4 dated Nov. 28, 2011 (8 pages).

European Examination Report from the European Patent Office for Application No. 12727805.9 dated Jan. 25, 2016 (5 pages).

Jafari et al., "Metal 3D-printed wick structures for heat pipe application: Capillary performance analysis," Applied Thermal Engineering, 2018, 143:403-414.

* cited by examiner

CAPILLARY DEVICE FOR USE IN HEAT PIPE AND METHOD OF MANUFACTURING SUCH CAPILLARY DEVICE

The present invention relates to a device for use in a heat exchange apparatus and to a method of manufacturing such a device. The invention also relates particularly, but not exclusively, to a capillary device for use in a heat pipe.

Heat pipes are devices in which heat is rapidly removed from a first region by means of evaporation of working fluid, and subsequently released at a second location by means of condensation of the working fluid.

Figure 1:
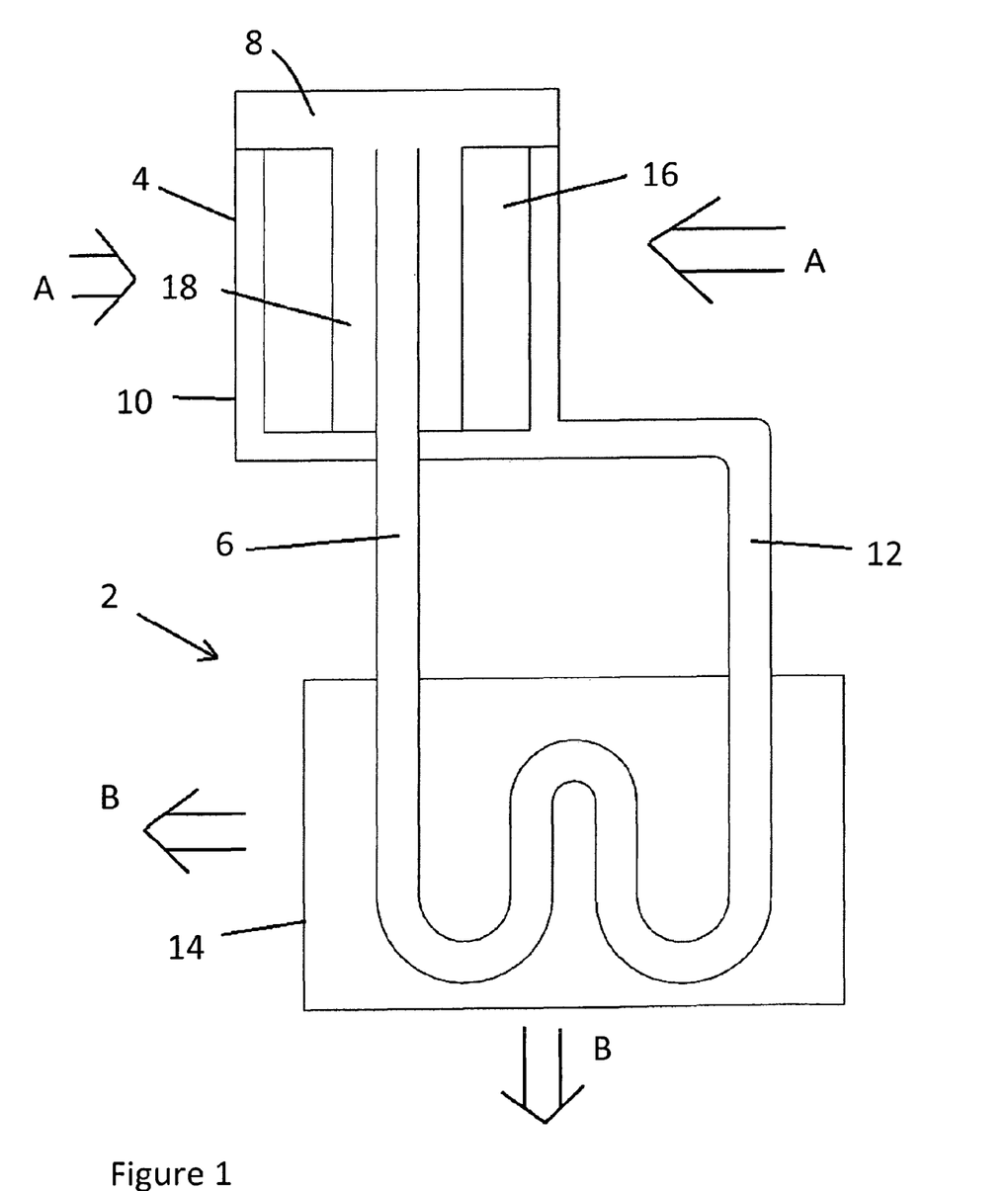
FIG. 1 is a schematic diagram of a conventional loop heat pipe.

A conventional loop heat pipe is shown in FIG. 1. The heat pipe 2 comprises a cylindrical evaporator 4 having an inlet 6 for condensed working fluid, the inlet 6 being in communication with a compensation chamber 8, and a cylindrical vapour passage 10 communicating with an outlet 12 for enabling evaporated working fluid to pass to a condenser 14. A capillary structure 16 surrounds a gap 18 surrounding the inlet 6, and is in turn surrounded by the vapour passage 10. The purpose of the compensation chamber 8 is to ensure that the gap 18 is always filled with condensed working fluid and to prevent over pressure within the loop heat pipe, since condensed working fluid is displaced into the compensation chamber as vapour is generated.

During operation of the heat pipe 2, heat in the vicinity of the evaporator 4, for example generated by electronics operating in a confined space, travels in the direction of arrows A to cause evaporation of the working fluid in the capillary structure 16. The evaporated working fluid then passes along vapour passage 10 and outlet 12 to the condenser 14 where heat can be more easily removed in the direction of arrows B and condensed working fluid is returned via inlet 6 and compensation chamber 8 to fill the gap 18 surrounding the inlet 6. Condensed working fluid is then transferred from the gap 18 to the vapour passage 10 through the capillary structure 16 by means of capillary action. The capillary structure 16 of the heat pipe 2 is manufactured by sintering of fine metal powder and subsequent machining to form the flow passages.

This arrangement suffers from the drawback that the sintering technique can only be carried out on a limited range of materials, and the complexity of possible shapes and dimensions of flow channels is limited by the machining technique.

Figure 2:
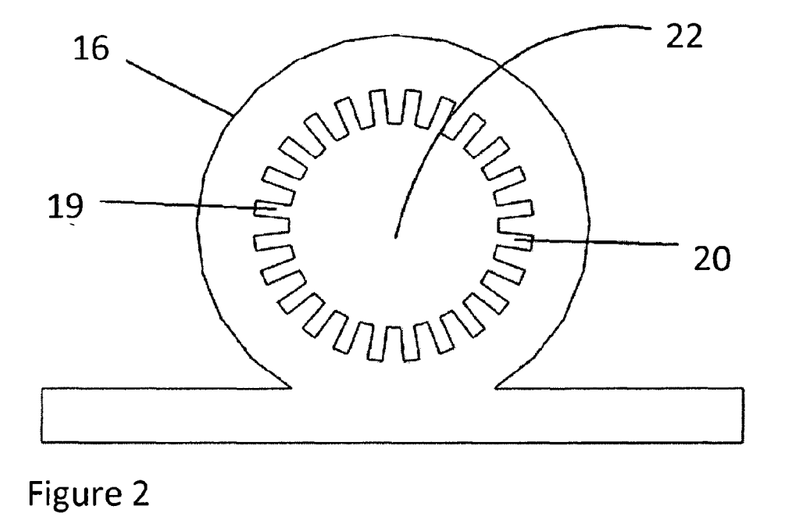
FIG. 2 is a cross sectional view of a conventional axially grooved heat pipe.

A conventional axially grooved heat pipe 16 is shown in FIG. 2. The heat pipe 16 has capillary structure 19 which is extruded from a suitable material and comprises a plurality of axial grooves 20 surrounding a central channel 22. Vaporised working fluid travels along the central channel 22 from a hot end of the heat pipe 16 to a cold end, and condensed working fluid travels in the opposite direction along grooves 20 by means of capillary action. The arrangement shown in FIG. 2 suffers from the drawback that the range of shapes and sizes of grooves 22 is limited by extrusion techniques, as a result of which the grooves 22 have channel widths in the region of 0.1 to 1 mm wide. This dimension of channel width is too large to provide sufficient surface tension to entrain condensed working fluid when operating against gravity, as a result of which this type of device can generally only be used in space applications such as satellite cooling.

Preferred embodiments of the present invention seek to overcome one or more of the above disadvantages of the prior art.

According to an aspect of the present invention, there is provided a capillary device for use in a heat transfer apparatus in which heat is transferred from at least one first region to at least one second region by means of working fluid, the capillary device comprising a body portion defining at least one chamber containing unmelted powdered material therein, wherein at least part of the periphery of at least one said chamber is porous to allow flow of condensed working fluid through said unmelted powdered material in said chamber by means of capillary action.

By providing at least one chamber containing unmelted powdered material therein, wherein at least part of the periphery of at least one said chamber is porous to allow flow of condensed working fluid through said unmelted powdered material in said chamber, this provides the advantage in the case of a heat pipe using capillary action to transport condensed working fluid, of increasing fluid transfer by means of capillary action, while minimising thermal conduction into the powdered material of the chamber, which in turn minimises the effect of parasitic heating of the working fluid passing through the powdered material. This in turn improves the cooling performance of a heat pipe incorporating the device.

The capillary device may be adapted to be used in a heat pipe in which heat is transferred from at least one evaporation region to at least one condensation region by means of evaporated working fluid, and at least part of the periphery of at least one said chamber may be porous to allow flow of condensed working fluid, by means of capillary action, through said unmelted powdered material in said chamber when flowing from a condensation region to an evaporation region.

At least a portion of said body portion in the vicinity of an evaporation region may have a porosity different from a porosity of at least a portion of said body portion remote from said evaporation region.

This provides the advantage of enabling the capillary action to be tailored to the various parts of the device and fluid flow to thereby be maximised.

The body portion may surround an elongate channel and at least one said chamber may be located between at least part of said channel and an evaporation region in use.

This provides the advantage of enhancing capillary action and thereby increasing fluid flow, thereby enabling the apparatus to be used when subject to gravity.

A plurality of said chambers may be spaced apart around the periphery of, and protruding into, said channel.

The capillary device may further comprise at least one vapour flow passage in said body portion for allowing flow of evaporated working fluid from an evaporation region to a condensation region.

At least part of the periphery of at least one said vapour flow passage may be porous.

Said body portion may comprise at least one support portion adapted to resist compressive forces applied to the capillary device, wherein at least part of at least one said support portion is porous to allow flow of condensed working fluid therethrough.

By providing at least one support portion which can contribute to the capillary action, this provides the advantage of reducing the weight of the capillary device.

According to another aspect of the present invention, there is provided a heat transfer apparatus comprising at least one capillary device as defined above.

At least one said capillary device may be connected to a plurality of condenser devices.

This provides the advantage of enabling a capillary device to be constructed by means of selective melting of powdered material to thereby enable a wider range of dimensions and properties of capillary structure to be provided, while enabling condenser devices manufactured according to simpler techniques such as extrusion to be used.

According to a further aspect of the present invention, there is provided a method of manufacturing a body portion of a capillary device for use in a heat transfer apparatus in which heat is transferred from at least one first region to at least one second region by means of working fluid, the method comprising forming successive layers of said body portion by means of selective melting of powdered material by means of an energetic beam, such that at least part of said body portion is porous to enable flow of condensed working fluid therethrough.

By forming successive layers of said body portion by means of selective melting of powdered material by means of an energetic beam, this provides the advantage of enabling a wider range of shapes of device to be constructed, and a wider range of materials to be used. This is particularly advantageous in the case of heat pipes which use capillary action to transfer condensed working fluid from a condensation region to an evaporation region. For example, the method of the present invention enables body portions of complex shapes having voids or hollow portions to save weight to be provided.

The selective melting of powdered material may provide melted powdered material and unmelted powdered material, and said body portion may define at least one chamber containing unmelted powdered material therein, wherein at least part of the periphery of at least one said chamber is porous.

The powdered material encapsulated in at least one said chamber may be the same material as the powdered material from which the successive layers are formed.

This provides the advantage of increasing the ease and speed of manufacture of the capillary device.

The method may be a method of manufacturing a capillary device adapted to be used in a heat pipe in which heat is transferred from at least one evaporation region to at least one condensation region by means of evaporated working fluid, wherein at least part of the periphery of at least one said chamber is porous to allow flow of condensed working fluid, by means of capillary action, through said powdered material in said chamber when flowing from a condensation region to an evaporation region.

The body portion may define at least one chamber, and the method may further comprise encapsulating powdered material in at least one said chamber to allow flow of condensed working fluid, by means of capillary action, through said powdered material in said chamber when flowing from a condensation region to an evaporation region.

The method may further comprise directing at least one stream of powdered material to a location at which said powdered material is melted by means of the energetic beam.

This provides the advantage of increasing the range of locations at which the device can be used.

At least one said stream of said powdered material may be constrained in a stream of inert gas.

Preferred embodiments of the invention will now be described, by way of example only and not in any limitative sense, with reference to the accompanying drawings, in which:—

Figure 3:
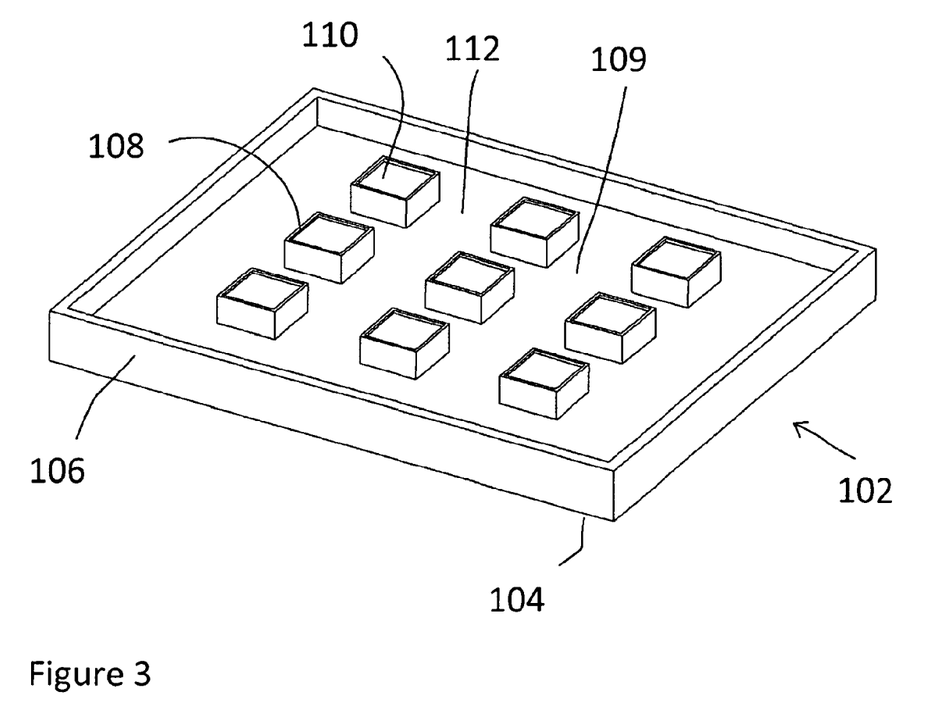
FIG. 3 is a perspective view of a flat heat pipe of a first embodiment of the present invention with an upper evaporator plate thereof removed.

Referring to FIG. 3, a flat heat pipe 102 of a first embodiment of the present invention is formed from aluminium and has an upper evaporator plate 124 (FIG. 4), a lower condenser plate 104 and solid side walls 106. Porous chambers 108 formed from aluminium are arranged between the upper evaporator plate 124 and the lower condenser plate 104, and unmelted aluminium powder 110 is provided inside the chambers 108. The regions 112 between the chambers 108 form a vapour space 109 covered by a layer 122 on the underside of upper evaporator plate 124 such that working fluid such as water is caused by the upper evaporator plate 124 to evaporate and transfer heat via the vapour space 109 to the lower condenser plate 104, and condensed working fluid passes by capillary action through the walls of the chambers 108 and the powdered aluminium 110 in the chambers 108 back to the upper evaporator plate 124. The powdered aluminium 110 enhances fluid flow due to capillary action, but thermal conduction through the powdered aluminium 110 is limited, as a result of which the parasitic heating effect on condensed working fluid passing through the aluminium powder 110 is minimised. This in turn maximises the amount of heat removed from the upper evaporator plate 124 by evaporation of the working fluid.

Figure 4:
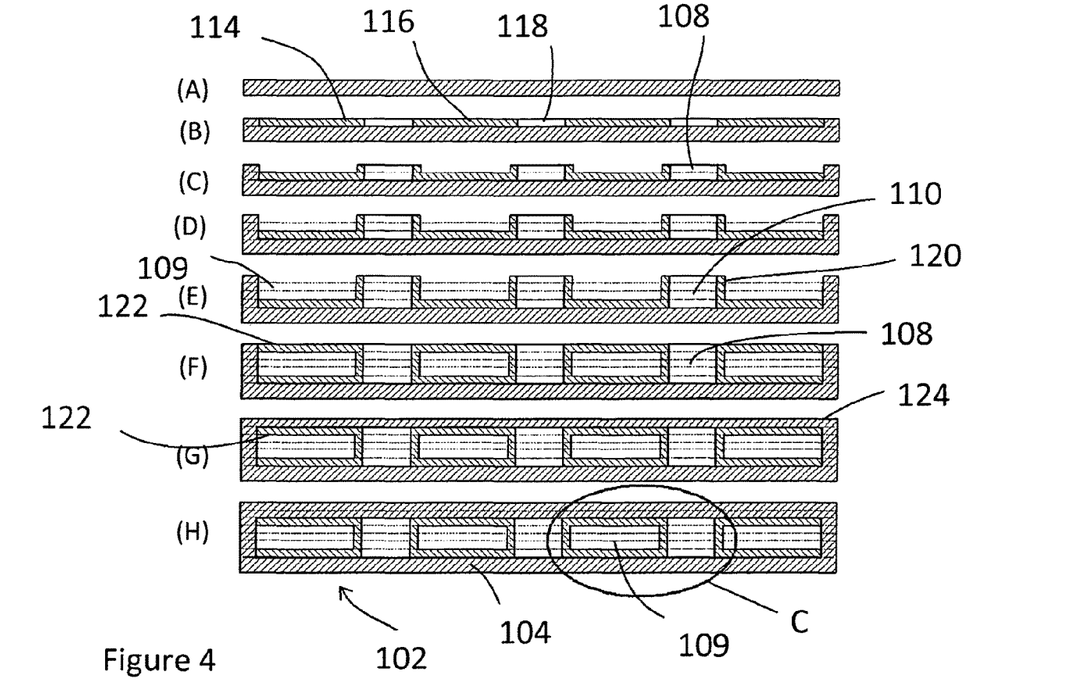
FIG. 4 is a schematic view of a process for forming the heat pipe of FIG. 3.

The formation of the heat pipe 202 of FIG. 3 is shown in detail with reference to FIGS. 4(*a*) to 4(*h*). Initially, as shown in FIG. 4(a), a solid sheet of aluminium is provided, to form lower condenser plate 104 and a layer 114 of powdered aluminium is placed on the donor material, as shown in FIG. 4(b). A high intensity energy beam (not shown) such as a laser beam is then directed onto the layer 114 of powdered material and the path of the beam controlled to selectively melt the layer of powder in the selected regions to form rigid porous regions 116 forming the base of the vapour space 109, separated by regions 118 of unfused powder material which forms the powdered aluminium 110 in the chambers 108. Further layers of powdered aluminium are added and selectively melted in FIGS. 4(c) to 4(e) to form porous side walls 120 of the chambers 108. Similarly, porous upper walls 122 of the vapour space 109 can be formed on the lower surface of solid upper evaporator plate 124 as shown in FIGS. 4(f) to 4(h).

Figure 5:
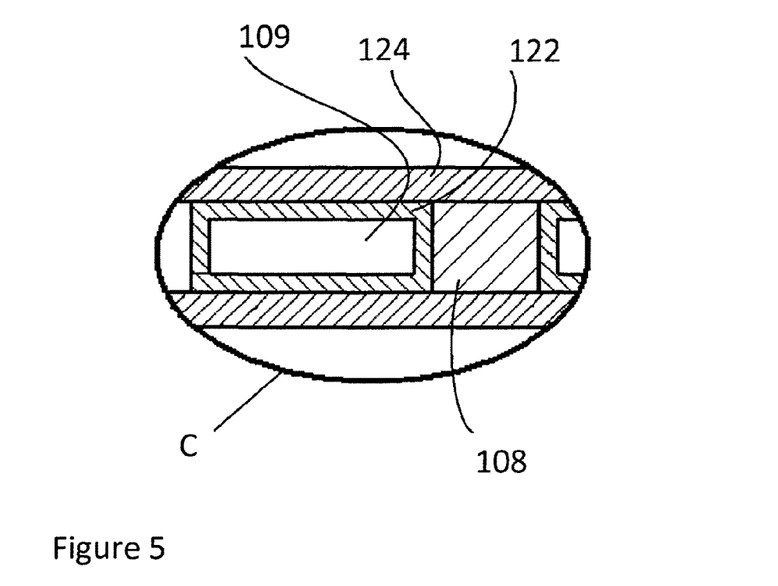
FIG. 5 is a detailed view of region C of the heat pipe of FIG. 4.

As shown in greater detail in FIG. 5, each of the chambers 108 encapsulates unmelted powdered material 110, and the vapour space 109 encloses a volume of working fluid at reduced pressure. In use, heat is removed from the upper evaporator plate 124 by evaporation of the working fluid enclosed in chambers 108 and transferred to the lower condenser plate 104 by condensation of the working fluid. The condensed working fluid can pass through the porous walls 120 of chambers 108 into the unfused powder material 110 and returned to the upper evaporator plate 124 through the powder material 110 by means of capillary action.

Figure 6:
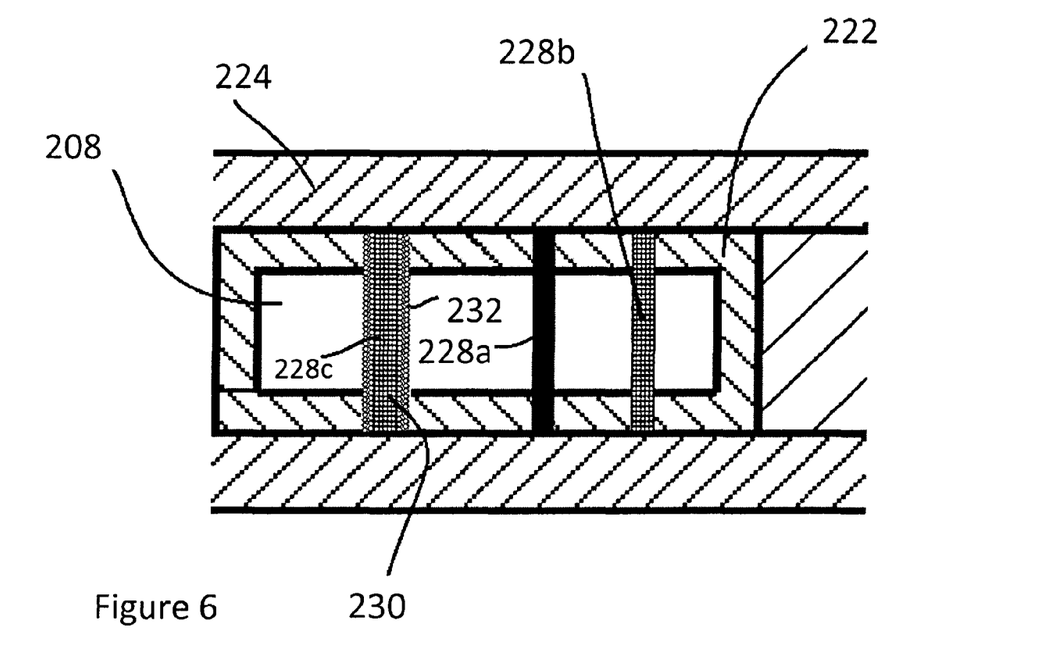
FIG. 6 is a detailed view of part of a heat pipe of a second embodiment of the present invention.

Referring to FIG. 6, in which parts common to the embodiment of FIGS. 3 to 5 are denoted by like reference numerals but increased by 100, a heat pipe of a second embodiment of the present invention differs from the arrangement shown in FIGS. 4 and 5 in that one or more support struts 228a, 228b, 228c extend through the interior of one or more of the chambers 208 to assist in capillary transfer of condensed working fluid between the condenser 204 and evaporator 224 plates and to enhance the mechanical strength of the heat pipe. The struts may be a single solid strut 228a, a 3D CAD generated micro capillary strut 228b, or a combination strut 228c consisting of a 3D micro capillary core 230 having a sintered structure 232 mounted on its outer walls. The struts 228b, 228c provide the advantage that by tailoring the 3D CAD geometry and the sintering and/or selective laser melting treatment, the capillary structure can be formed with a graded porosity and permeability, which allows customisation of the mass flow rate of the condensed working fluid around the device. In an alternative arrangement, the sintered structure can be provided on the inside of the strut 228c and the 3D CAD capillary structure on the external surface of the strut.

Figure 7:
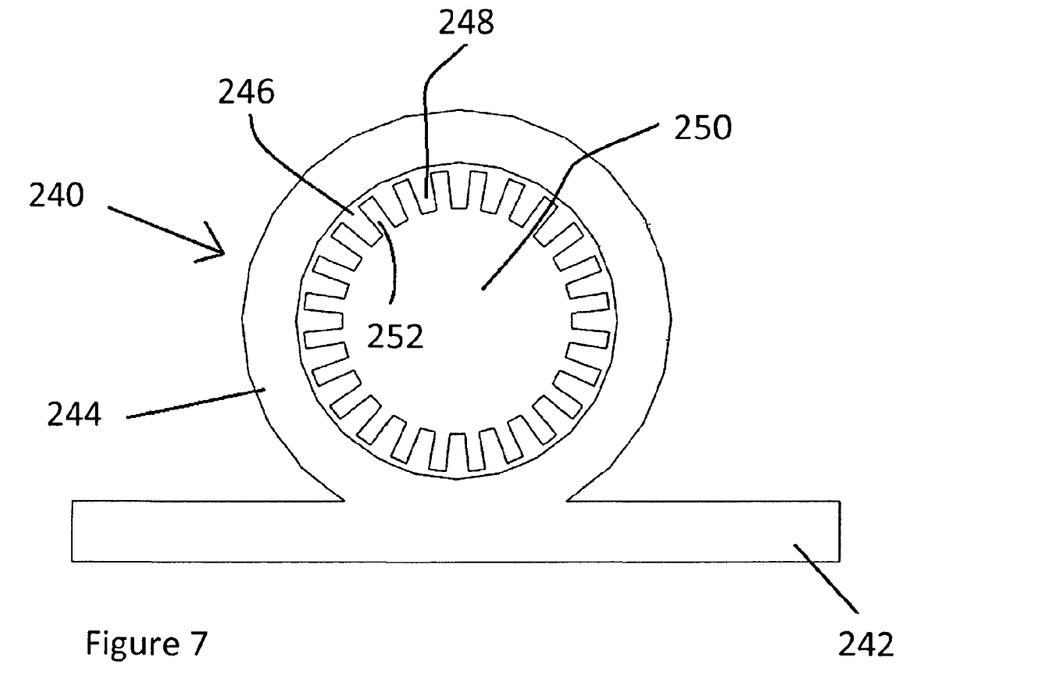
FIG. 7 is a side cross sectional view of a capillary device of an axially grooved heat pipe of a third embodiment of the present invention.

Referring to FIG. 7, a capillary device 240 for use in an axially grooved heat pipe of a third embodiment of the present invention is shown. The capillary device 240 is built up by means of selected laser melting of aluminium powder to build up successive layers on a solid donor plate 242 for placing in contact with a heat source, a solid aluminium housing 244, and a capillary structure 246 comprising circumferentially separated porous aluminium protrusions 248 protruding into a central elongate channel 250. By use of the selective laser melting technique used to form the capillary structure 246, the porous protrusions 248 can be separated by smaller channel widths than in the case of the known arrangement shown in FIG. 2, as a result of which the protrusions 248 and gaps 252 therebetween generate significantly enhanced capillary action compared with the arrangement shown in FIG. 2, thereby enabling the heat pipe to operate under the influence of gravity and have improved heat transfer performance.

In operation, one end of the capillary device 240 is placed in contact with a heat source, and the other end is placed in contact with cooling means to form a condenser. The heat source causes the working fluid to evaporate, and evaporated working fluid travels along the central channel 250 to the condenser. Condensed working fluid travels along the axial gaps 252 between protrusions 248, and is drawn through the porous protrusions 248 by capillary action at the hot end of the heat pipe to maintain the flow of condensed working fluid to the evaporator. The porous protrusions 248 and gaps 252 cooperate to enhance the capillary action to the extent that the capillary action can overcome the effects of gravity.

Figure 8:
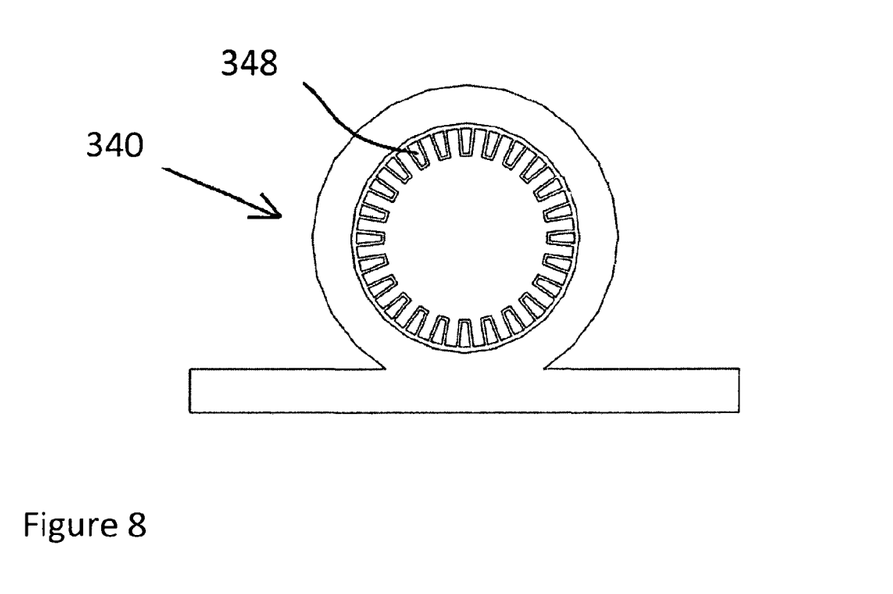
FIG. 8 is a side cross sectional view, corresponding to FIG. 7, of a capillary device of an axially grooved heat pipe of a fourth embodiment of the present invention.

Referring to FIG. 8, in which parts common to the embodiment of FIG. 7 are denoted by like reference numerals but increased by 100, a capillary device 340 of a heat pipe of a fourth embodiment of the present invention differs from the arrangement shown in FIG. 7 in that porous protrusions 348 are hollow and contain unfused aluminium powder to enhance the capillary action of flow of condensed working fluid through the porous walls of the protrusions 348 and the powder contained in the protrusions 348.

Figure 9:
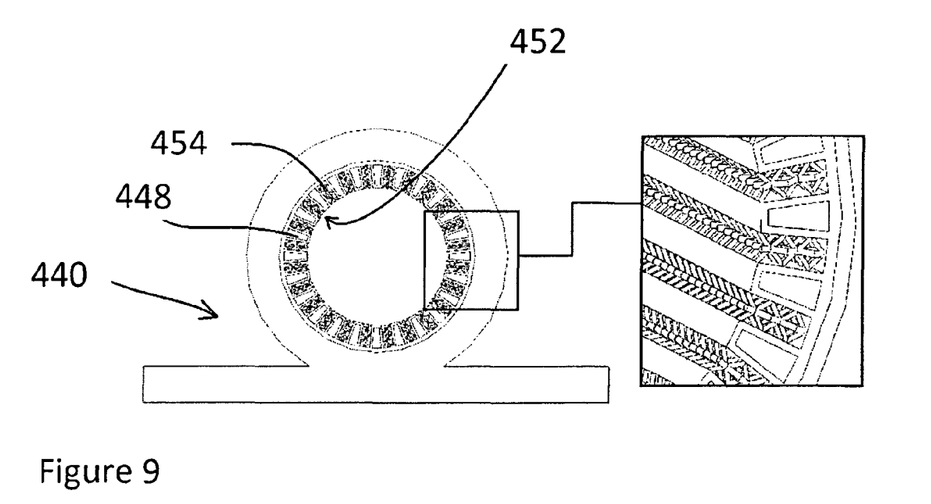
FIG. 9 is a side cross sectional view, corresponding to FIG. 8, of a capillary device of a fifth embodiment of the present invention.

FIG. 9 shows a capillary device 440 of a heat pipe of a fifth embodiment of the present invention, in which parts common to the embodiment of FIG. 8 are denoted by like reference numerals but increased by 100. The capillary device 440 of FIG. 9 differs from the arrangement shown in FIG. 8 in that a lattice capillary structure 454 is formed in longitudinal gaps 452 between porous protrusions 448 by means of a selective laser melting or sintering process to form capillary pores having characteristic dimensions below 50 microns at the condenser end of the heat pipe to draw condensed working fluid into the capillary structure. At the condenser, there is also a transition from sintered capillary to lattice within the channel, and as the lattice moves towards the evaporator region, the minimum characteristic dimension is graded to produce open channels with minimum characteristic dimension that are suitable to allow passage of evaporated working fluid. At the evaporator, the lattice may be removed completely to remove any restriction to flow of evaporated working fluid into the vapour channel along the centre of the heat pipe. By grading the pore size along the length of the heat pipe, the means in which it interacts with the working fluid can be manipulated. At the condenser end of the heat pipe, the capillary structure 454 is tailored to draw in and become flooded with condensed working fluid, and the adiabatic region of the heat pipe is tailored to provide a high mass flow rate of fluid from the condenser to the evaporator regions. At the evaporator region, the capillary structure 454 is tailored to allow much larger surface heat fluxes to be input over this region. Through the thickness of the evaporator capillary structure, its properties are graded to allow the vapour to easily pass from the capillary structure 454 into the vapour space and also to provide a flow of liquid fluid to the vapour generation sites.

Figure 10:
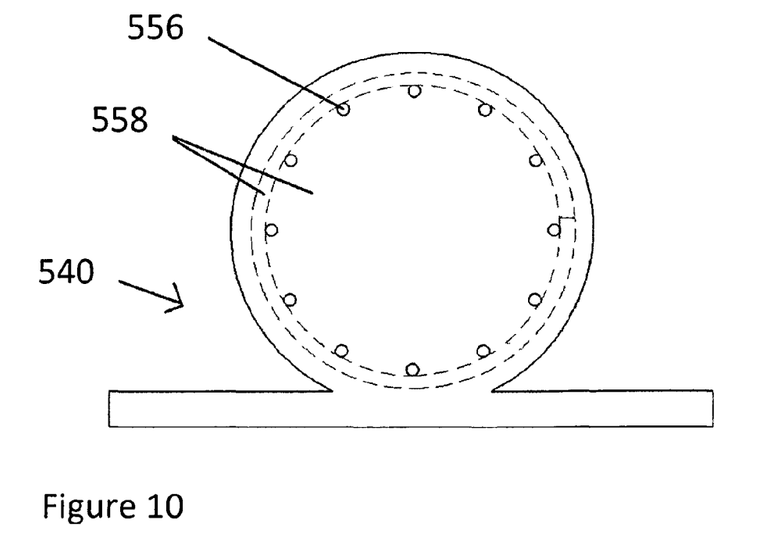
FIG. 10 is a side cross sectional view, corresponding to FIG. 9, of a capillary device of a sixth embodiment of the present invention.

Referring to FIG. 10, a selective laser melting process is used to build up a capillary device 540 as a single solid component having vapour flow channels 556 for passage of evaporated working fluid. To improve heat transfer, the vapour flow channels 556 are entirely embedded within a porous capillary structure 558, in order to increase the evaporation heat transfer surface area around the walls of the vapour flow channels 556. Since it is no longer necessary to machine the vapour flow channels 558, the shape and flow path into the device is unlimited.

Figure 11:
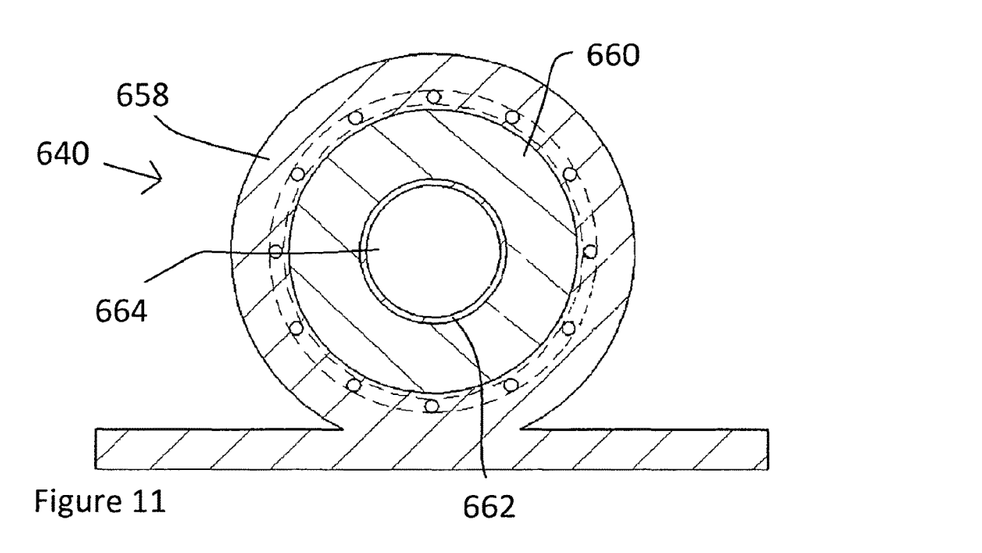
FIG. 11 is a side cross sectional view, corresponding to FIG. 10, of a capillary device of a heat pipe of a seventh embodiment of the present invention.

Referring to FIG. 11, in which parts common to the embodiment of FIG. 10 are denoted by like reference numerals, a capillary device 640 differs from the arrangement shown in FIG. 10 in that the porous capillary structure 658 in which the vapour flow channels are formed encapsulates aluminium powder material 660 and has a radial inner wall 662 surrounding a central fluid flow passage 664.

Figure 12:
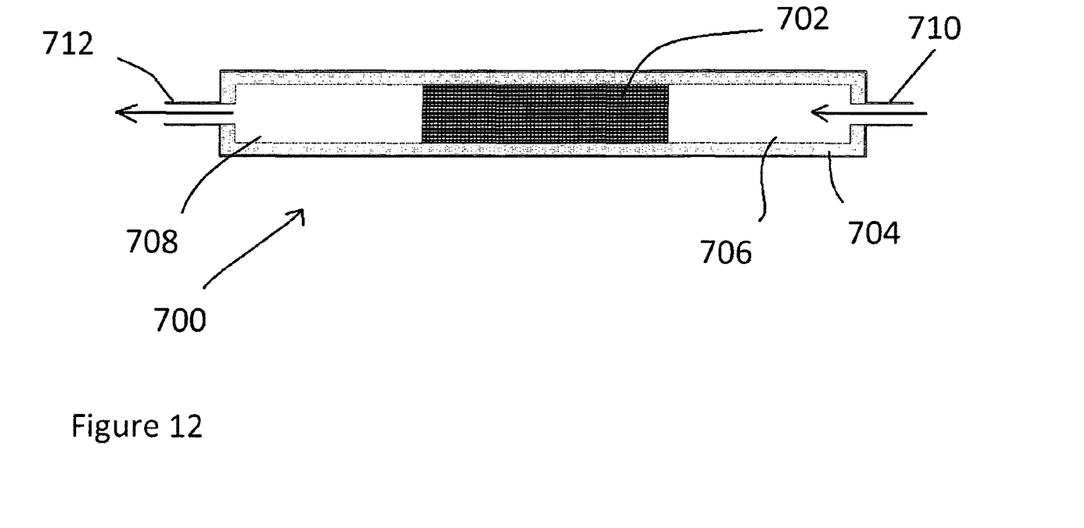
FIG. 12 is a schematic view of a heat transfer apparatus of an eighth embodiment of the present invention.

A heat transfer apparatus 700 of a further embodiment of the present invention is shown in FIG. 12. The apparatus 700 has a main body 704 divided by a porous capillary structure 702, having porous rigid walls and containing unmelted powdered material, into an inlet chamber 706 and an outlet chamber 708. Liquid working fluid introduced through an inlet 710 enters the capillary structure 702 via the inlet chamber 706 and is heated by heat passing through the side wall of the main body 704. The heated working fluid then passes in heated liquid or vapour form via the outlet chamber 708 and through an outlet 712.

Figure 13:
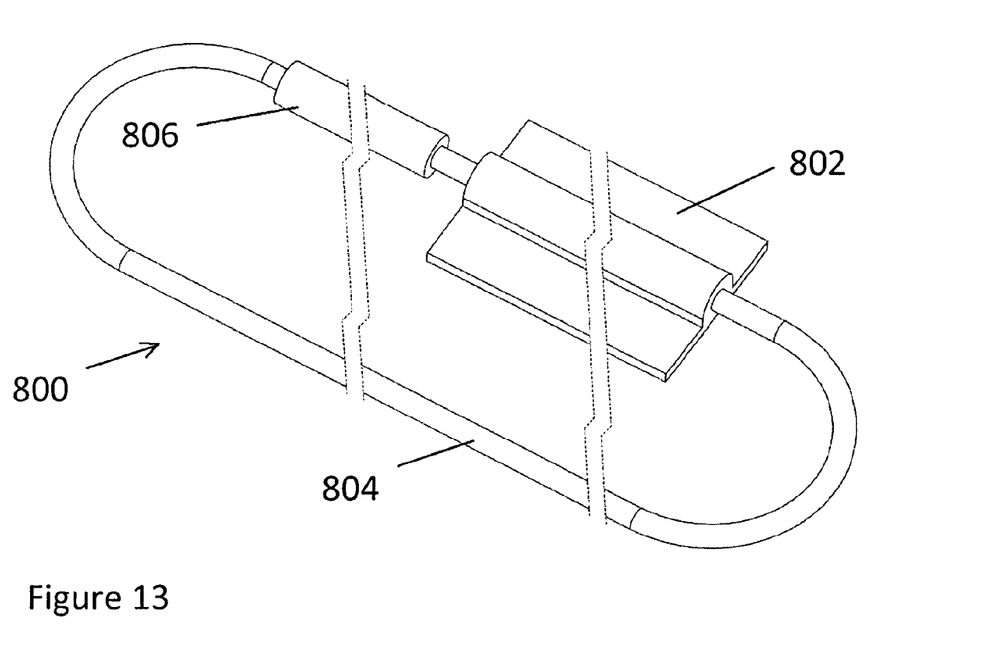
FIG. 13 is a perspective view of a heat transfer apparatus of a ninth embodiment of the present invention.
Figure 14:
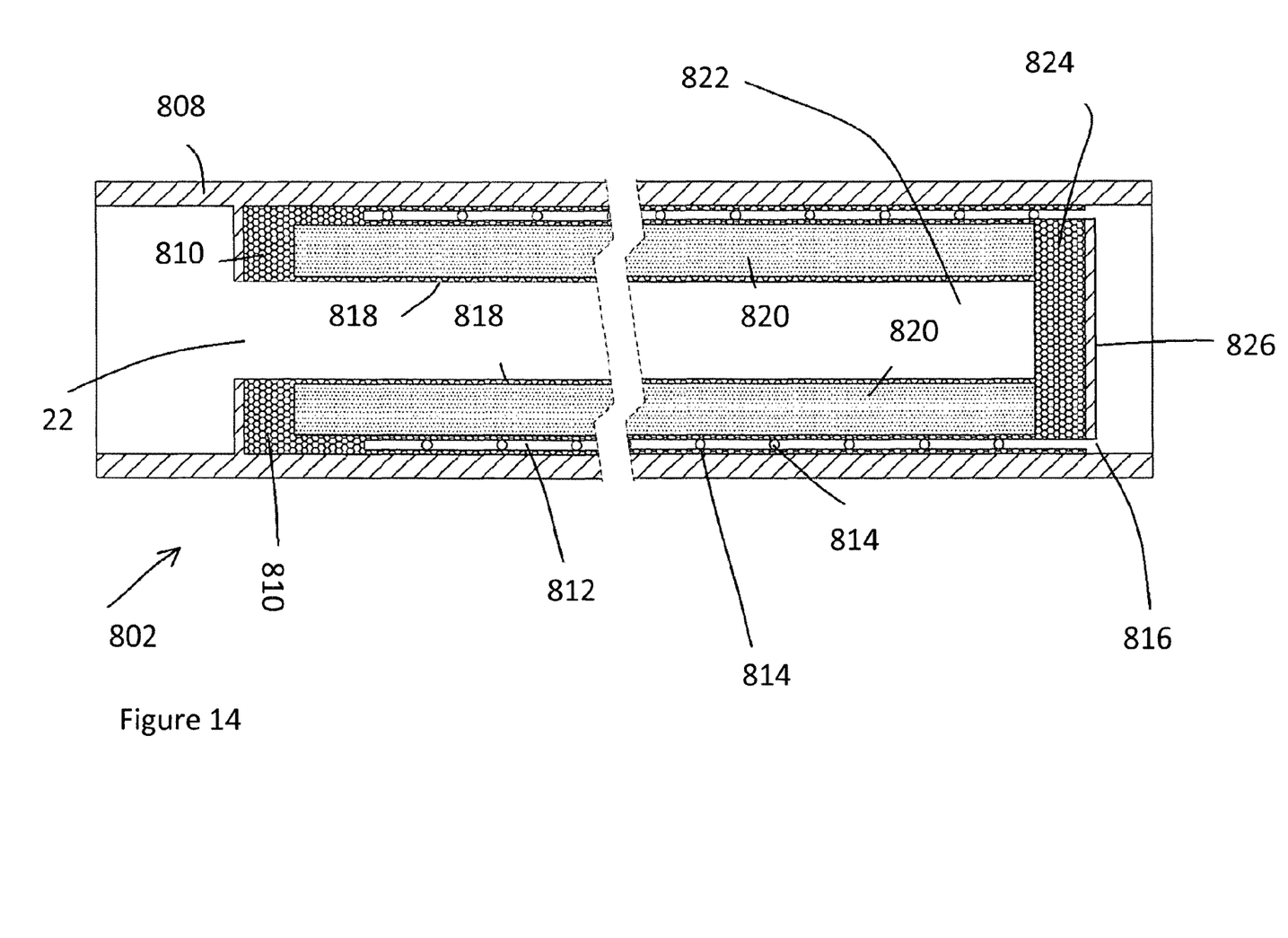
FIG. 14 is a side cross sectional view of an evaporation apparatus of the heat transfer apparatus of FIG. 13.

Referring to FIGS. 13 and 14, a heat transfer apparatus 800 of a ninth embodiment of the present invention is in the form of a flanged loop heat pipe comprising an evaporation chamber 802 cooperating with a condensation loop 804 and a cylindrical compensation chamber 806. As shown in more detail in FIG. 14, the evaporation chamber 802 has an outer cylindrical body 808 in which a porous capillary structure 810 defines a complex 3D vapour flow network 812 comprising a series of circumferential vapour channels 814 interconnected by an elongate escape channel 816. The capillary structure 810 also defines an annular chamber 818 enclosing unmelted metallic powder material 820. The chamber 818 surrounds a central bore 822 which is closed by an end face 824 of the capillary structure 810 and a solid wall 826. By manufacturing the capillary structure 810 by means of selective melting of metallic powder to form successive layers, complex 3D capillary structures having a wider range of dimensions and properties can be provided.

In operation, the evaporation device 802 cooperates with the compensation chamber 806 such that the central bore 822 of the evaporation device 802 is filled with condensed working fluid which passes into the capillary structure 810 and unmelted metallic powder 820 within the chamber 818 by means of capillary action. When the evaporation chamber 802 is brought into contact with a source of heat (not shown), working fluid evaporates from the radially outer parts of the capillary structure 810 and passes into the vapour flow network 812 and out of the fluid vapour escape hole 816 into condensation loop 804 where it is condensed by means of cooling at a location separated from the heat source. Condensed working fluid then passes into the end of the compensation chamber 806 remote from the evaporation chamber 802.

Figure 15:
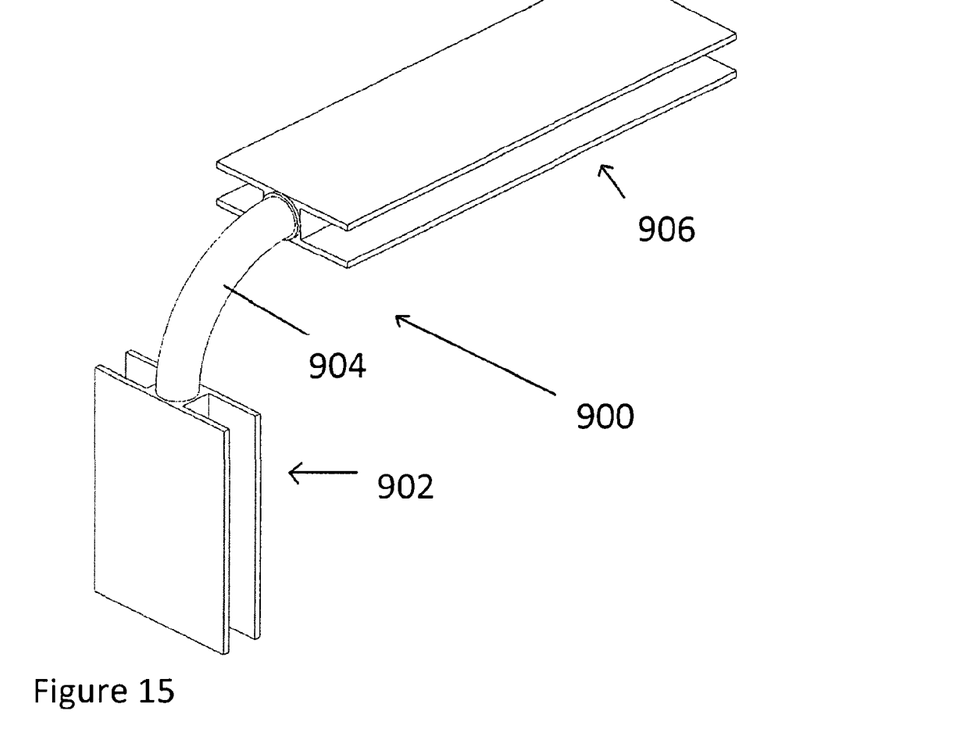
FIG. 15 is a perspective view of a heat transfer apparatus of a tenth embodiment of the present invention.
Figure 16:
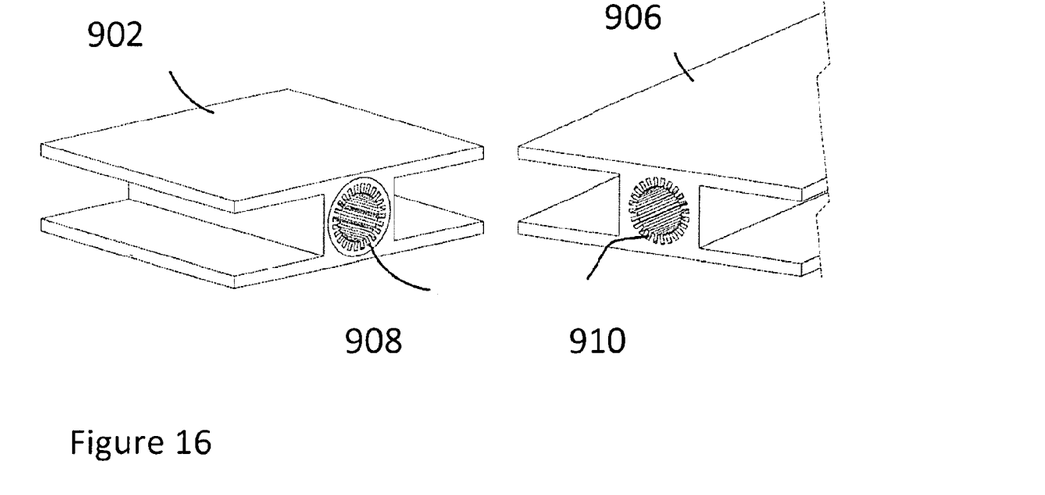
FIG. 16 is a view of an evaporation apparatus and a condenser apparatus of the heat transfer apparatus of FIG. 15 with an adiabatic section of the heat transfer apparatus removed.

FIGS. 15 and 16 show a heat pipe 900 in which an evaporation section 902, manufactured in successive layers by means of selective melting of metallic powder, is connected, by means of a curved adiabatic section 904, to a much longer extruded condenser section 906 having a flow channel design 910 which matches that of the evaporation section 902. The evaporation section 902 has a grooved capillary structure 908, which may contain unmelted metallic powder, having enhanced performance which therefore enables larger amounts of heat to be input into the evaporator section 902, thereby enabling the device 900 to cool smaller, high power devices. Evaporated working fluid passes along a central channel (not shown) of the curved adiabatic section 904 to the longer condenser section 906, while condensed working fluid passes along a capillary structure (not shown) contained in the curved adiabatic section 904 to the capillary structure 908 of the evaporation section 902.

Figure 17:
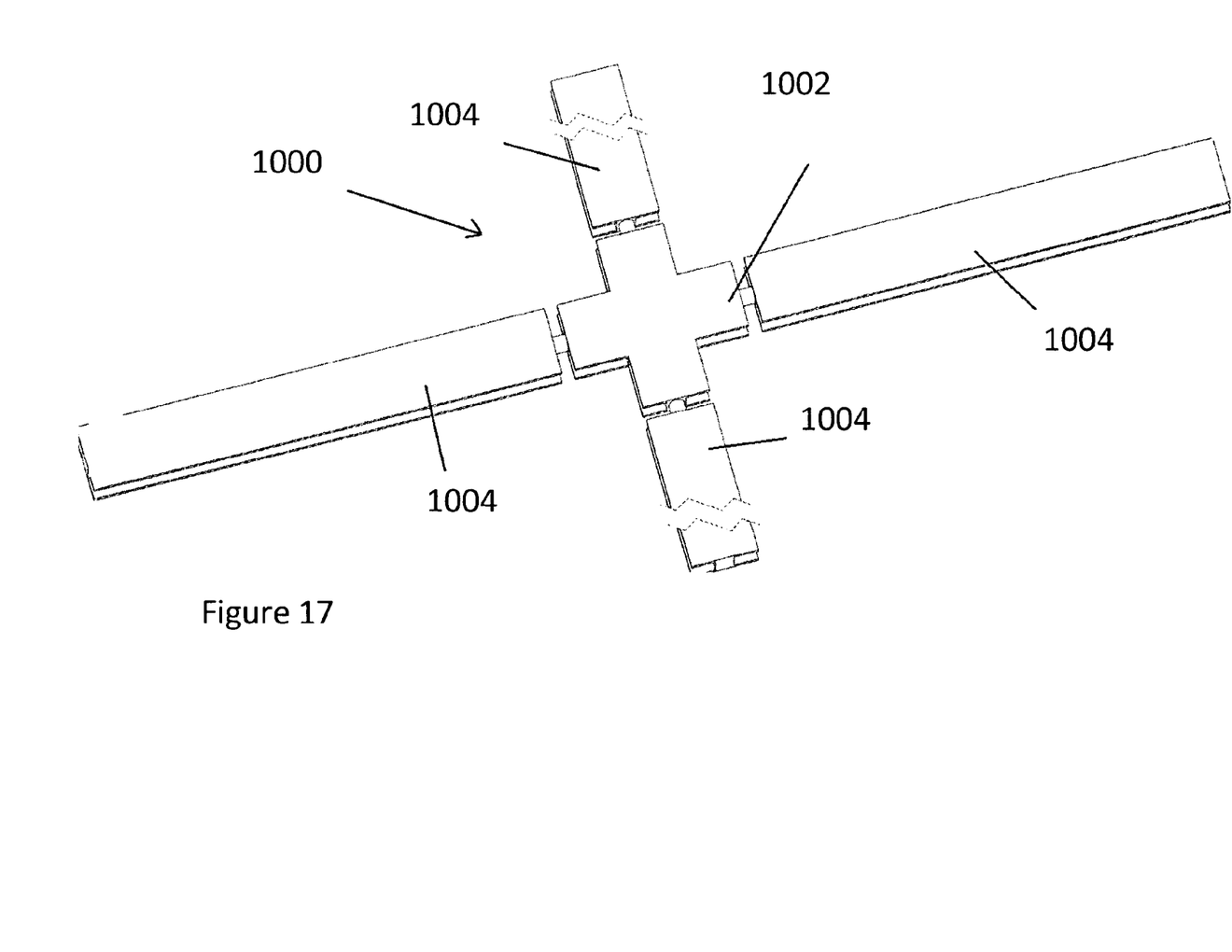
FIG. 17 is a schematic view of a heat transfer apparatus of an eleventh embodiment of the present invention.

FIG. 17 shows a heat transfer apparatus 1000 of an eleventh embodiment of the present invention in which a single central evaporator section 1002 having a capillary structure (not shown), manufactured in successive layers by means of selective melting of powdered metallic material using an energetic beam, is connected to multiple, larger condensation sections 1004, each of which is manufactured by means of conventional extrusion methods.

It will be appreciated by persons skilled in the art that the above embodiments have been described by way of example only and not in any limitative sense, and that various alterations and modifications are possible without departure from the scope of the invention as defined by the appended claims. For example, as an alternative to a selective laser melting process, electron beam melting may be used. In addition, as an alternative to selective melting of a layer of powdered material, a stream of powdered material may be directed by means of inert gas to the location at which the powdered material is melted by the energy beam. This enables a wider range of applications of the process to be used. Furthermore, in addition to aluminium, other powdered materials such as metals, metal alloys or polymer materials may be used.

What is claimed is:

1. A method of manufacturing a heat transfer apparatus in which heat is transferred from a first region to a second region by a working fluid, the method comprising placing successive layers of powdered material over a donor material and selectively melting regions of each successive layer of powdered material by an energetic beam, wherein the selective melting of the powdered material forms at least one fused powdered material region and at least one unfused powdered material region in each successive layer, such that the at least one fused powdered material region in the successive layers of powdered material form at least one chamber extending from the first region to the second region and enclosing the at least one unfused powdered material region in the successive layers of powdered material.

2. The method according to claim 1, wherein the at least one fused powdered material region in the successive layers of powdered material form at least one rigid porous wall that defines at least a portion of the at least one chamber.

3. The method according to claim 1, wherein the first region of the heat transfer apparatus includes an evaporation region, the second region of the heat transfer apparatus includes a condensation region and the heat transfer apparatus includes a vapor space that extends between the evaporation region and the condensation region, wherein the at least one fused powdered material region in one of the successive layers of powdered material forms at least a portion of a periphery of the vapor space.

4. The method according to claim 3, wherein the at least one fused powdered material region includes a plurality of fused powdered material regions in the one successive layer of powdered material, wherein the plurality of fused powdered material regions form at least a portion of a periphery of the vapor space adjacent the condensation region.

5. The method according to claim 3, wherein the at least one fused powdered material region includes a plurality of fused powdered material regions in the one successive layer of powdered material, wherein the plurality, of fused powdered material regions form a periphery of the vapor space adjacent the evaporation region.

6. The method according to claim 1, wherein the selective melting of the powdered material forms a plurality of fused powdered material regions and a plurality of unfused powdered material regions in each successive layer of powdered material, and wherein the plurality of fused powdered material regions in the successive layers of powdered material together form a plurality of chambers.

7. The method according to claim 6, wherein the plurality of the fused powdered material regions in the successive layers of powdered material form a plurality of rigid porous walls and each rigid porous wall defines at least a portion of one of the plurality of chambers.

8. The method according to claim 1, wherein the selective melting of the powdered material forms a plurality of fused powdered material regions and a plurality of unfused powdered material regions in each successive layer of powdered material, wherein the fused powdered material regions of the successive layers of powdered material form a plurality of rigid porous walls to at least partially define a plurality of chambers that extend between the first region and the second region with each chamber enclosing an unfused powdered material region, and wherein space between the plurality of chambers forms a vapor space.

9. The method of claim 1, wherein the first region of the heat transfer apparatus includes an evaporator region, the second region of the heat transfer apparatus includes a condenser region, and the heat transfer apparatus comprises an evaporator plate in the evaporator region and a condenser plate in the condenser region spaced apart from the evaporator plate, wherein the evaporator plate and the condenser plate at least partially define a vapor space therebetween, wherein the at least one chamber extends between the evaporator plate and the condenser plate.

10. The method of claim 9, wherein the selective melting of the powdered material forms a plurality of fused powdered material regions and a plurality of unfused powdered material regions in each successive layer of powdered material, wherein the fused powdered material regions of the successive layers of powdered material form a plurality of rigid porous walls that at least partially define a plurality of chambers, wherein each chamber encloses a plurality of unfused powdered material regions, and wherein the plurality of rigid porous walls extend between the evaporator plate and the condenser plate.

11. The method of claim 10, wherein space between the plurality of chambers forms the vapor space.

12. A method of manufacturing a heat transfer apparatus in which heat is transferred from an evaporator region to a condenser region by a working fluid, the method comprising placing successive layers of powdered material over a donor material, melting spaced-apart selective regions of powdered material in each successive layer by an energetic beam to form fused powdered material regions separated by unfused powdered material regions, wherein each fused powdered material region in each successive layer of powdered material aligns with a fused powdered material region in an adjacent layer of powdered material and each unfused powdered material region in each successive layer of powdered material aligns with an unfused powdered material region in an adjacent layer of powdered material, wherein the fused powdered material regions of the successive layers of powdered material form a plurality of rigid porous walls to at least partially define a plurality of chambers that extend between the evaporator region and the condenser region, with each chamber enclosing an unfused powdered material region in each successive layer of powdered material.

13. The method according to claim 12, wherein the evaporator region includes an evaporator plate and the condenser region includes a condenser plate spaced apart from the evaporator plate, wherein the evaporator plate and the condenser plate at least partially define a vapor space therebetween, wherein the plurality of chambers extend between the evaporator plate and the condenser plate.

14. The method according to claim 13, wherein the plurality of rigid porous walls extend between the evaporator plate and the condenser plate to form the plurality of chambers.

15. The method according to claim 13, wherein space between the plurality of chambers forms a vapor space.

16. The method according to claim 13, wherein the fused powdered material regions form a periphery of the vapor space adjacent the condensation plate.

17. The method according to claim 13, wherein the fused powdered material regions form a periphery of the vapor space adjacent the evaporator plate.

18. A method of manufacturing a heat transfer apparatus in which heat is transferred by a working fluid from an evaporator plate to a condenser plate through a vapor space disposed between the evaporator plate and the condenser plate, the method comprising placing a first layer of powdered material on the condenser plate, melting spaced-apart selective regions of powdered material in the first layer of powdered material by an energetic beam to form fused powdered material regions separated by unfused powdered material regions, wherein each fused powdered material region in the first layer of powdered material forms a fused porous region adjacent the condenser plate, placing successive layers of powdered material over the first layer of powdered material, melting spaced-apart selective regions of powdered material in each successive layer of powdered material by an energetic beam to form fused powdered material regions separated by unfused powdered material regions, wherein each fused powdered material region in each successive layer of powdered material aligns with a fused powdered material region in an adjacent layer of powdered material and each unfused powdered material region in each successive layer of powdered material aligns with an unfused powdered material region in an adjacent layer of powdered material, wherein the fused powdered material regions of the successive layers of powdered material form a plurality of rigid porous walls to at least partially define a plurality of chambers that extend between the evaporator plate and the condenser plate, wherein each chamber encloses a plurality of unfused powdered material regions, and wherein each fused powdered material region in a last layer of powdered material forms a fused porous region adjacent the evaporator plate.

19. The method according to claim 18, wherein space between the plurality of chambers forms the vapor space.

20. The method according to claim 18, wherein each of the plurality of rigid porous walls at least partially defines one of the plurality of chambers.

21. The method of claim 18, wherein the selective melting of each layer of powdered material forms a region of fused powdered material around a periphery of each layer, wherein the fused powdered material regions formed around the periphery of each of the layers of powdered material together form a fused porous region that extends between the evaporator plate and the condenser plate.

* * * * *